United States Patent
Tsujimoto et al.

(10) Patent No.: US 6,810,582 B2
(45) Date of Patent: Nov. 2, 2004

(54) COMPONENT INCORPORATION AND LIQUID FILLING DEVICE OF LIQUID FILLED VIBRATION ISOLATING MOUNT

(75) Inventors: Yoshikazu Tsujimoto, Nishiku (JP); Tsuyoshi Inada, Nishiku (JP); Akio Sasaki, Nishiku (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 41 days.

(21) Appl. No.: 10/183,249

(22) Filed: Jun. 27, 2002

(65) Prior Publication Data

US 2003/0183996 A1 Oct. 2, 2003

(30) Foreign Application Priority Data

Apr. 1, 2002 (JP) ........................................ 2002-099352

(51) Int. Cl.[7] ................................................. B23P 19/00
(52) U.S. Cl. ............................. 29/801; 29/240; 248/636
(58) Field of Search ....................... 29/801, 240, 281.1, 29/281.5; 248/636

(56) References Cited

U.S. PATENT DOCUMENTS

| | | | | |
|---|---|---|---|---|
| 2,434,660 | A | * | 1/1948 | Knight .......................... 29/270 |
| 4,280,434 | A | * | 7/1981 | Beckerer, Jr. ................ 114/174 |
| 5,551,477 | A | * | 9/1996 | Kanno et al. ................ 137/553 |
| 6,216,340 | B1 | * | 4/2001 | Fassbind et al. .............. 29/773 |
| 6,421,894 | B1 | * | 7/2002 | Tsujimoto et al. .......... 29/33 K |
| 6,425,575 | B1 | * | 7/2002 | Takashima et al. .... 267/140.13 |
| 6,439,554 | B1 | * | 8/2002 | Takashima et al. .... 267/140.13 |
| 6,651,305 | B2 | * | 11/2003 | Fassbind et al. ........... 29/426.1 |
| 6,662,833 | B2 | * | 12/2003 | Tsujimoto et al. .......... 141/269 |

FOREIGN PATENT DOCUMENTS

| | | |
|---|---|---|
| JP | 62-199325 | 9/1987 |
| JP | 5-010376 | 1/1993 |
| JP | 9-210116 | 8/1997 |
| JP | 11-230235 | 8/1999 |

* cited by examiner

Primary Examiner—David P. Bryant
Assistant Examiner—Essama Omgba
(74) Attorney, Agent, or Firm—Jordan and Hamburg LLP

(57) ABSTRACT

A component incorporation and liquid filling device of a liquid filled vibration isolating mount uses a relatively small liquid bath disposed above a fixedly held, upwardly facing body component, and when moved downwardly, an opening portion provided on a bottom portion thereof is assembled in a sealed state. Liquid supplied onto the bottom portion flows into the body component and is stored on the top of the bottom portion. Components are assembled to the body component in the liquid, and the liquid contained. The seal member is fitted to the opening portion by screwing means from the lower surface side. A notch for a screwing operation is provided on the upper surface of an outer circumferential body of the seal member whereby the screwing operation can be implemented from the upper surface side, thereby facilitating replacement of the seal member.

4 Claims, 12 Drawing Sheets

F I G. 12
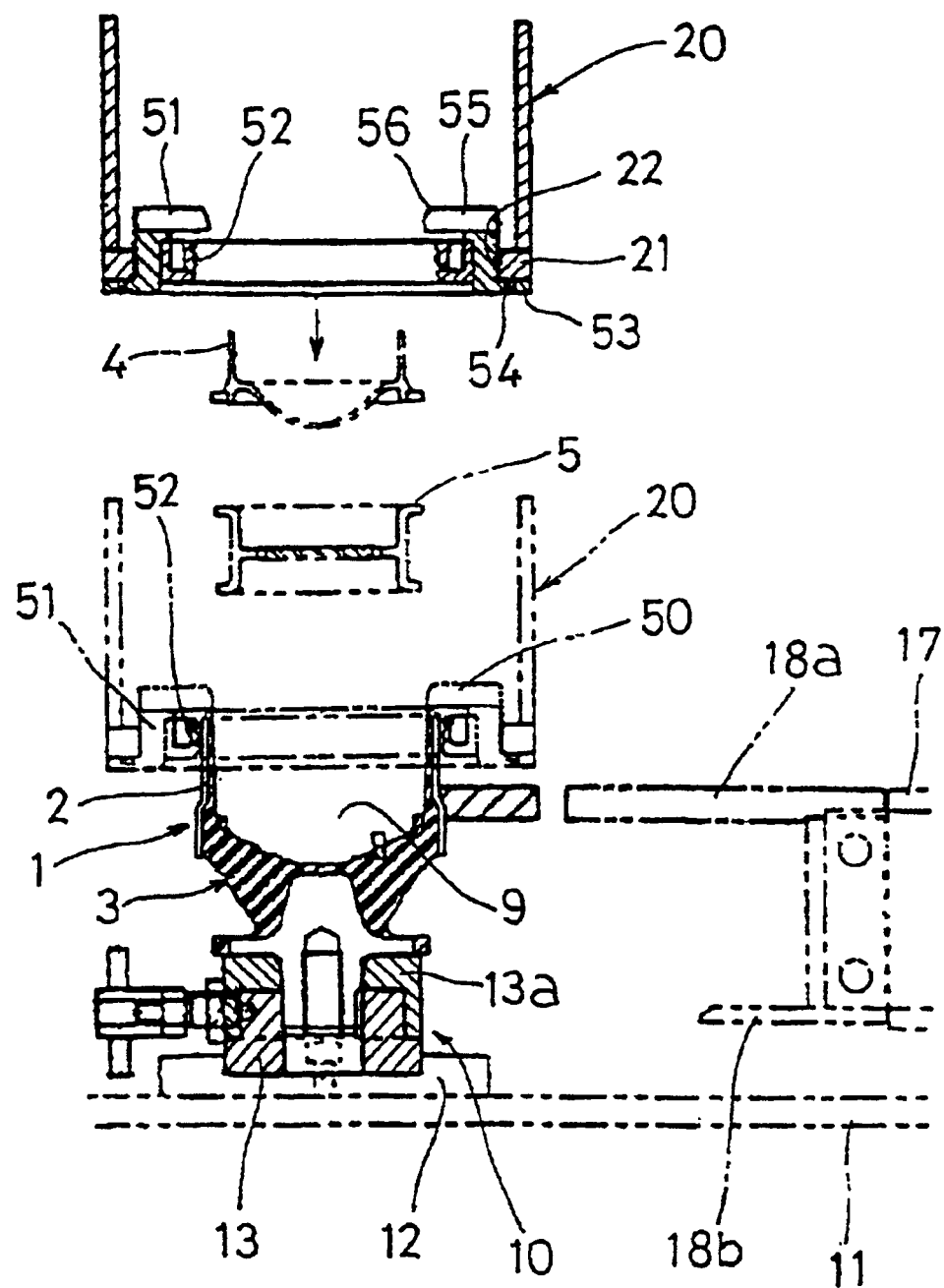

COMPONENT INCORPORATION AND LIQUID FILLING DEVICE OF LIQUID FILLED VIBRATION ISOLATING MOUNT

BACKGROUND OF THE INVENTION

1. Field of the Invention

This invention relates to component incorporation and a liquid filling device used in assembly of a liquid filled vibration-isolating mount mainly used to support an engine for an automobile for the purpose of vibration isolation.

2. Description of Related Art

As illustrated in FIG. 15, a liquid filled vibration isolating mount includes a cylindrical body fitting 2, a rubber elastomer 3 as a vibration isolating substrate and a diaphragm which assumes a part of chamber wall. A liquid filled body interior is partitioned into, for example, upper and lower liquid chambers 6a, 6b, by a partition portion 5. Both liquid chambers 6a, 6b are connected by an orifice 7 on the partition portion 5, and vibration is damped and absorbed by liquid flow resistance brought about by the orifice 7 and vibration isolating effects of the rubber elastomer 3. Such type of liquid filled vibration isolating mount has been known, and used as a mount supporting an automobile engine and the like, so as not to transmit vibration produced thereby to a vehicle body.

Vulcanization is used for adhering the rubber elastomer 3 to an opening portion on one end of the cylindrical body fitting 2. Similarly, the liquid filled vibration isolating mount is also assembled by vulcanization, adhering an attachment fitting 8 to the rubber elastomer 3, subsequently forming a body component 1 wherein there is a space for containing the liquid, incorporating the components such as partition portion 5 and diaphragm 4 and the like into the body component 1, and simultaneously containing the liquid inside the body component 1.

A relatively large-sized liquid bath has heretofore been used to incorporate the components and contain the liquid when assembling the vibration isolating mount. More than one process, such as a setting process for holding the body component in the liquid, a process incorporating the components, such as a partition portion and diaphragm into the body component, a caulking process for fixing the assembled components, and a process for taking out the assembled mount from the liquid bath, have been set up, whereby the component assembling operation is to be carried out in the liquid.

However, in the case of component incorporation and liquid containing methods for a conventional vibration isolating mount, since a large liquid bath and further complicated large-scaled transportation means are required, installation space requirements are increased and disposition and maintenance/control against setup changing operations and problems associated therewith are also troublesome. Furthermore, foreign substances, such as casting sands and rubber wastes are prone to be brought into the liquid bath, causing improper incorporation, such as mixture of air bubbles therewith and the like. Additionally, there are problems such as troublesome washing of an outer circumferential portion of the mount products after assembly, and the like.

Therefore, an applicant of this invention has suggested a component incorporation and liquid filling device of a type using a relatively small liquid bath, similar to JP-A-11-230235, to diminish the aforementioned conventional problems.

In reference to this suggested type of liquid filling device, the body component is faced upwards and held under a nearly perpendicular condition, and the liquid bath, capable of vertical movement, is arranged upwards thereof. An opening portion at a part of the bottom portion of the liquid bath is fitted on an outer circumference of the body component when the liquid bath is lowered, and is assembled so as to hold a sealing condition therewith. The liquid is supplied over the bottom portion having the opening of the liquid bath, and the liquid flows from the opening of the body component into the inside spacing of the body component. When a required amount of the liquid is accumulated and stored above the bottom portion, the component incorporation device comprised of a multi-axis multi-jointed robot and the like is operated under this condition to fit and assemble the components, such as partition portion and diaphragm, inside the body component and in the opening portion while immersing in the accumulated liquid and deaerating. The liquid is contained and sealed, and the accumulated liquid in the liquid bath is then drained from the bottom portion thereon, thus releasing the liquid bath from the body component.

It is noted, with regards to the component assembly, a seal member, such as a commercially available oil seal, is fitted to the opening portion disposed at the bottom portion of the liquid bath in order to secure the sealing condition fitted and assembled to the body component. As shown in FIG. 16, with regard to the seal member, a seal body 152 made of the rubber elastomer is secured to an inner circumference of an annular outer circumferential body 151 made of a rigid material by vulcanization adhering means or press-fit means and the like.

The seal member 150 is required to be replaced with the corresponding seal member attendant on modification of shape and the like of the body component when changing the particular vibration isolating mount setup to be assembled. Accordingly, the seal member 150 is fitted detachably to the bottom portion 121 of the liquid bath 120 through a screwing means of the outer circumferential body 151. In particular, in order to best minimize the seal material 154 for sealing the screwed portion to be retained or come into contact with the liquid, the seal member 150 is screwed and fitted from the underside to the bottom portion 121 of the liquid bath 120. Screwing holes 157 are also provided at several places on the underside of the outer circumferential body 151 for the screwing operations.

However, in case of the conventional seal member 150, it is necessary to carry out screwing operation for detachment from the bottom portion of the liquid bath with one's head faced upwards in a narrow space below the liquid bath, so that operability is extremely difficult even if a screwing jig is used, resulting in time-consuming replacement and also longer downtime for setup operation.

This invention is made to solve the problems described above related to the component incorporation and liquid filling device which uses the liquid bath, by allowing the seal member fitted to the opening portion at the bottom portion of the liquid bath to be screwed from the upper surface side.

SUMMARY OF THE INVENTION

This invention is a component incorporation and liquid filling device of the liquid filled vibration isolating mount, comprising a body set holding portion which supports and secures the body component of the vibration isolating mount, having an inside space and an opening on one end side, with the opening faced upwards in nearly perpendicular state. A liquid bath which is disposed above the body set holding portion so as to be vertically movable includes an opening portion provided on the bottom portion to engage with an outer circumference of the body component in a state of seal through a descent action, and is capable of storing liquid over the bottom portion under the condition incorporated into the body component by means of engagement of the opening portion. A liquid supplying/discharging means which supplies and discharges the liquid to and from the top of the bottom portion having the opening portion corresponding with assembling action of the liquid bath to the body component is also provided. A component incorporation device is provided, which serves to assemble the components such as partition portion, diaphragm, and the like, to the body component in the liquid. In accordance with the invention, an annular seal member elastically fitted on the body component is fitted to the opening portion on the bottom of the liquid bath by means of the screwing means from the lower surface side against the bottom portion, the seal member being provided so as to be able to screw in from the upper surface side.

According to the component incorporation and liquid filling device, the body component of the vibration isolating mount is held by the body set means with the opening faced upwards in a nearly perpendicular state, the liquid bath disposed above the body set holding portion is moved downwardly, and the opening portion provided on the bottom portion can be assembled in a sealed state by engaging through the seal member fitted thereto with the body component. Therefore, by supplying the liquid to the top of the liquid bath under this condition, the liquid flows from the opening of the body component which protrudes above the bottom portion into the inside space, allowing a predetermined amount of liquid to be stored on the top of the bottom portion. Through the operation of the component incorporation device under the liquid storing condition, the components, such as partition portion, diaphragm, and the like, can be fitted and assembled into the opening of the body component in the liquid, allowing the liquid to be contained.

When changing the setup of the vibration isolating mount to be assembled, the seat member fitted to the opening portion of the bottom portion in the liquid bath is replaced with the corresponding seal member according to shape change of the body component. However, even if the seal member is fitted by the screwing means from the lower surface side of the bottom portion, it is possible to perform its replacing operation easily because the screwing operation can be done from the upper surface side of the liquid bath.

Additionally, since the seal member is screwed and fitted from the lower surface side against the bottom portion of the liquid bath, the seal material at the screw portion can be held in the same manner as the conventional one, requiring less area in contact with the liquid.

The seal member is formed by the seal body made of the rubber elastomer fitted to the annular inner circumference made of the rigid material, and fitted to the inner circumference of the opening portion, which is on the bottom portion of the outer circumferential body, by the screwing means. A notch for a screwing operation is provided on the upper surface of the outer circumferential body provided on the top of the bottom portion. Thereby, the seal member can easily be detached by the screwing operation from the upper surface side using the screwing jig, allowing a facilitated replacing operation.

It is preferable that the outer circumferential body of the seal member has a positioning inner flange, on which the upper end portion of the body component engaging with the seal body is abutted, on the inner circumference of the upper end portion protruding from the upper surface of the bottom portion, and that a notch groove for screwing operation in the crosswise direction with respect to an axial center is formed on the upper surface of the outer circumferential body including the inner flange. Thereby, the body component fitted to the inside thereof can be positioned, and the thus assembled condition of the body component with the liquid bath can always be kept constant, accordingly allowing the component assembling operation to be performed smoothly and stably using the component incorporation device.

BRIEF DESCRIPTION OF THE DRAWINGS

FIG. 12 is a sectional view showing a relation between the body set holding portion and a liquid layer of other example.

DETAILED DESCRIPTION OF THE PREFERRED EMBODIMENTS

The embodiments of the invention will be hereinafter described by way of examples with reference to the accompanying drawings.

Figure 1:
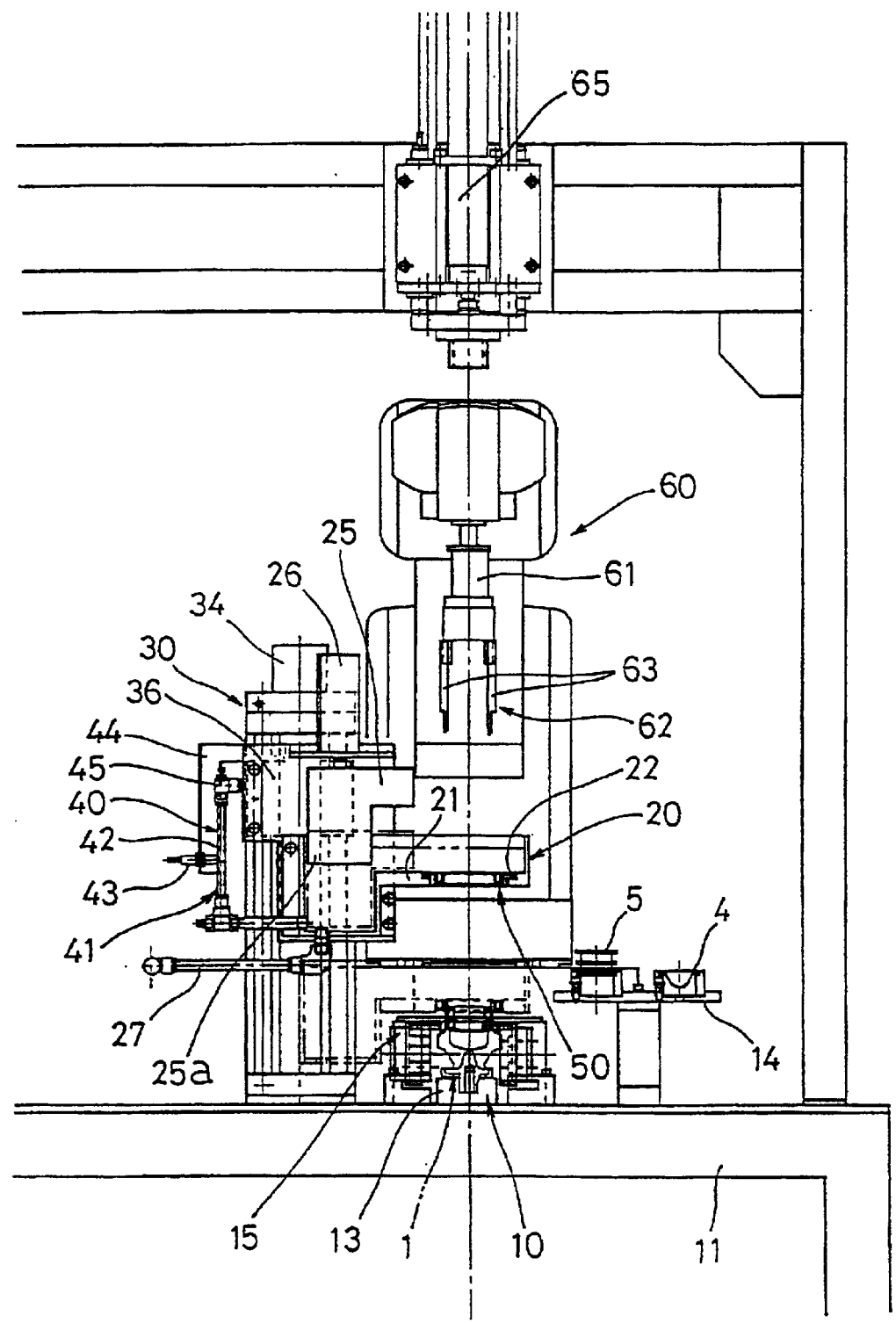
FIG. 1 is an elevational view showing an entire liquid filled device of one embodiment of the invention.
Figure 2:
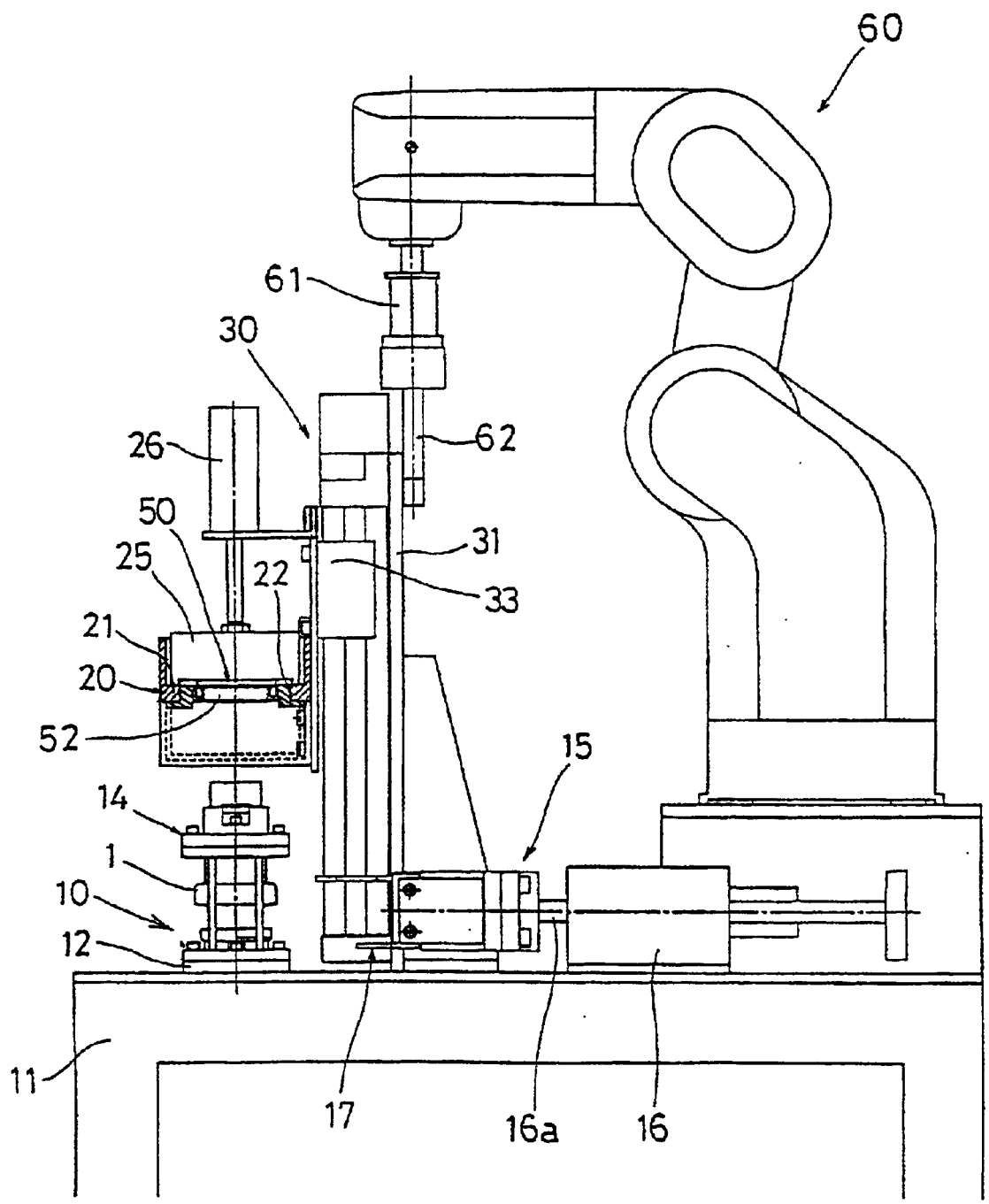
FIG. 2 is a side view showing the principal part of the embodiment of the invention.
Figure 3:
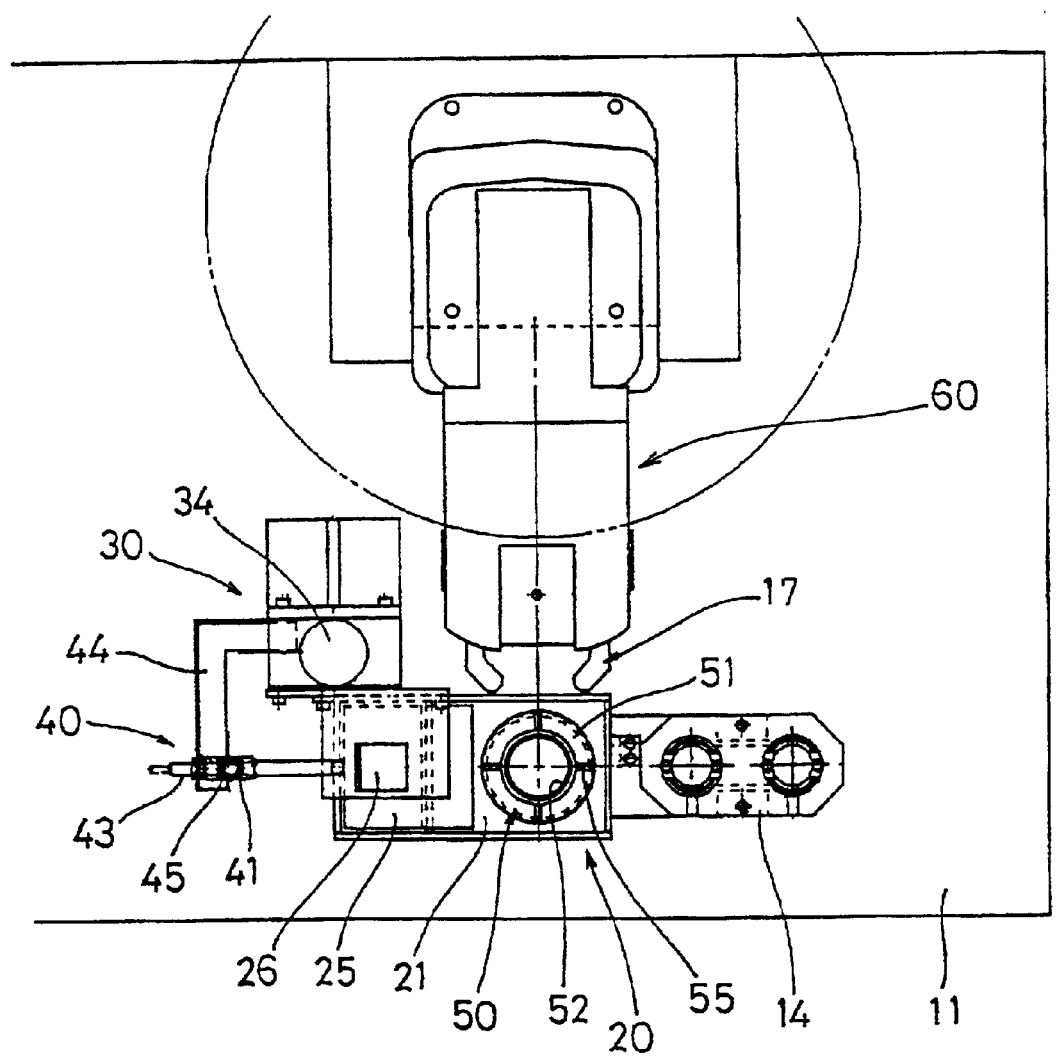
FIG. 3 is a plan view showing the principal part of the embodiment of the invention.

FIG. 1 is an elevational view showing one embodiment of a component incorporation and liquid filled device according to the invention. FIG. 2 is a side view of the principal part of the device. FIG. 3 is a plan view of the principal part of the device.

Figure 15:
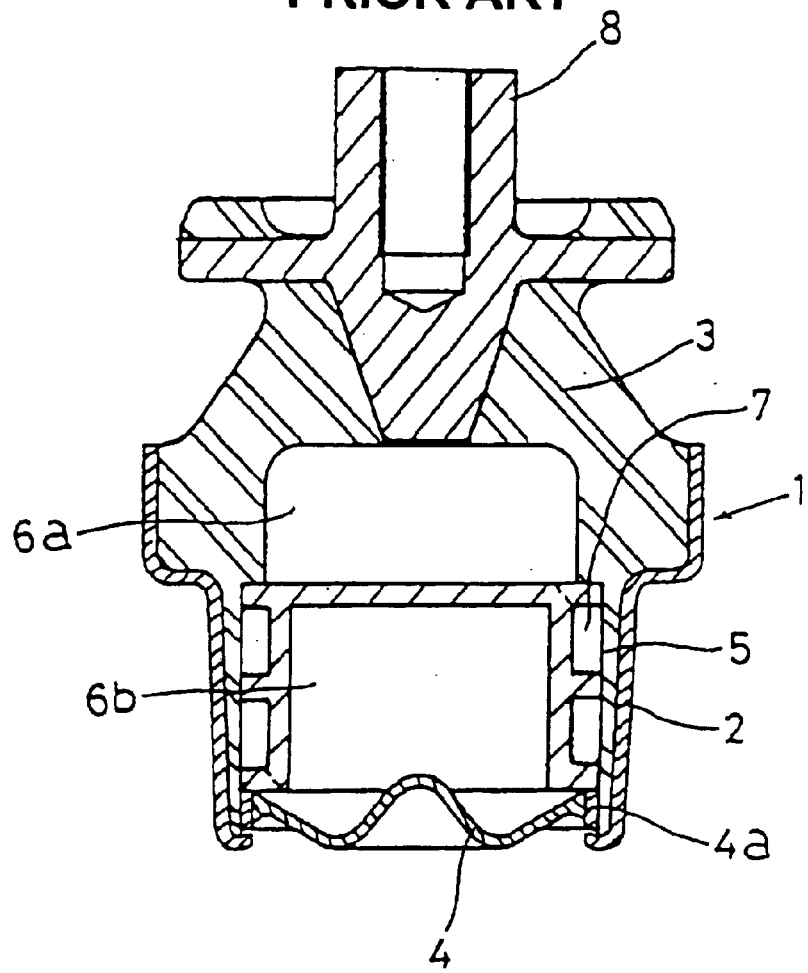
FIG. 15 is a sectional view illustrating a liquid filled vibration isolating mount to be assembled.
Figure 16:
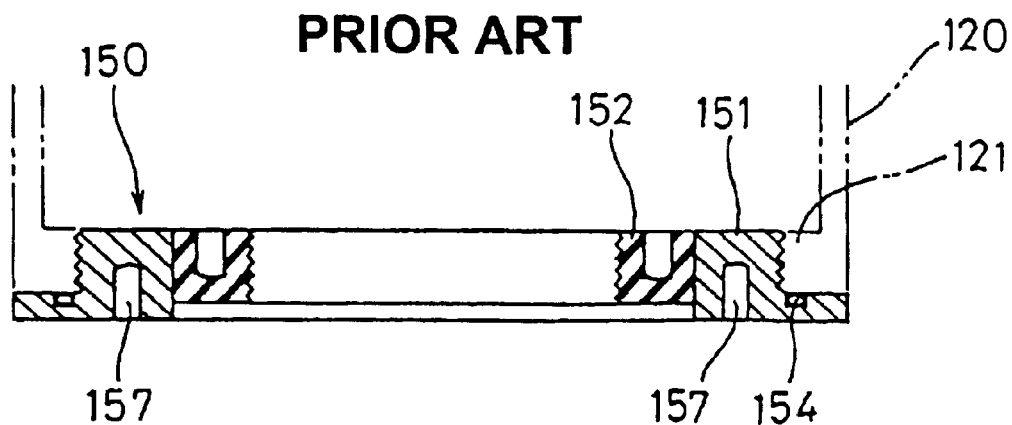
FIG. 16 is an enlarged sectional view of a conventional seal member.

In the figures, the reference numeral 10 designates a body set holding portion which supports and secures a body component 1 at a given set position on a base 11. The body set holding portion 10 has a support member 13 of the body component 1 secured to a part of a plate 12, and allows the body component 1 having an inside space 9 for containing the liquid to be supported with the opening faced upwards. The body component 1 is made up of a rubber elastomer 3 of a vibration isolating mount as shown in FIG. 15, that is, secured on an opening portion on one end side of a cylindrical body fitting 2 by vulcanization adhering means as vibration isolating substrate and, further, an attachment fitting 8 secured to the rubber elastomer 3.

The reference numeral 14 designates a component setting jig provided on the plate 12 in the vicinity of the support member 13, capable of supplying and placing a partition portion 5 and a diaphragm 4 inside the vibration isolating mount at the predetermined position.

Figure 9:
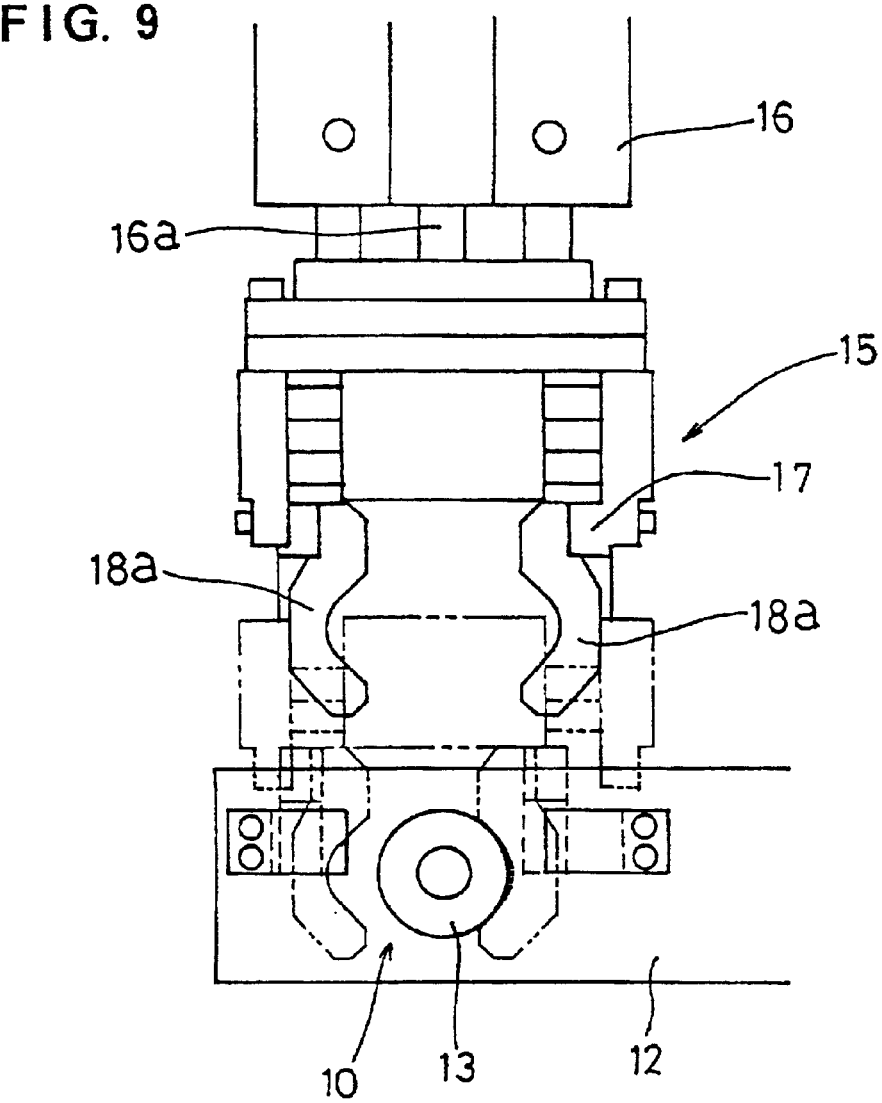
FIG. 9 is an enlarged plan view of a body set holding portion.
Figure 10:
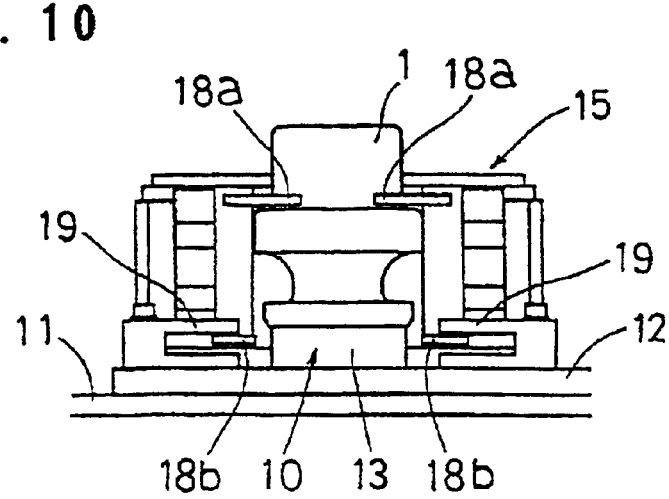
FIG. 10 is an elevational view showing a fixing state of the body component of the embodiment of the invention.
Figure 11:
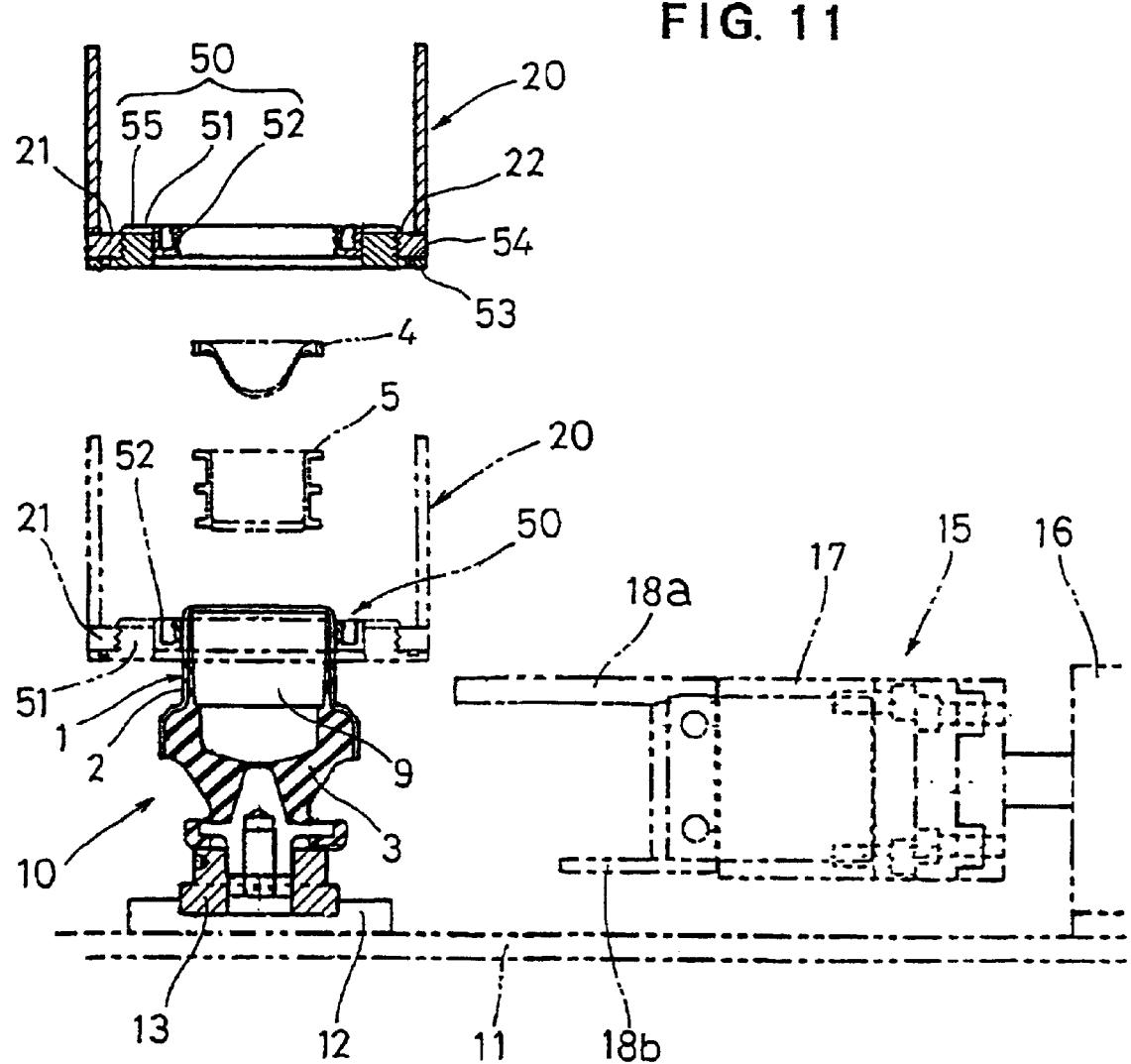
FIG. 11 is a sectional view showing a relation between the body set holding portion and a liquid layer.

The body set holding portion 10 is provided with a securing means 15 to hold the body component 1 supported by the support member 13 under a fixed condition, as shown in FIGS. 9 to 11.

The securing means 15 comprises a cylinder device 16 operated by hydraulic or pneumatic pressure and a chuck device 17 fixed at a front end portion of an output rod 16a. Under a condition where the body component 1 is supplied on the support member 13 of the body set holding portion 10, the cylinder device 16 is operated by operating a button or the like to advance the chuck device 17 which serves to chuck the body component 1 so as to secure and hold it at a predetermined position.

The chuck device 17 is provided with a pair of upper claws 18a, 18a and lower claws 18b, 18b at respective upper and lower positions so as to be opened and closed. The upper claws 18a, 18a are provided to hold the body component 1 from both sides. The lower claws 18b, 18b are provided to mate with nearly U-shaped engaging members 19, 19 disposed oppositely on both sides of the support member 13 to restrain the chuck device 17 from moving upwards.

Figure 13:
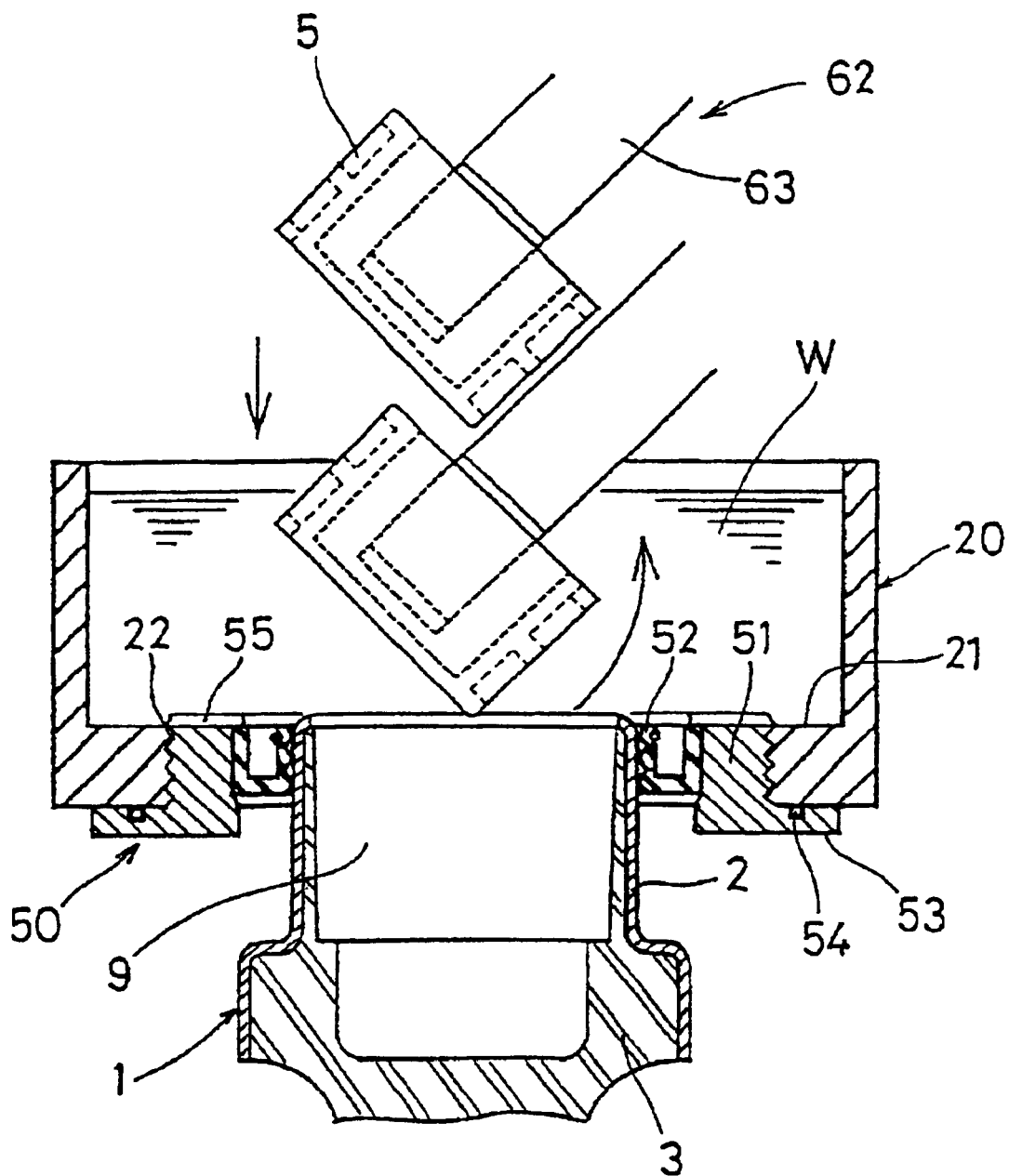
FIG. 13 is an enlarged sectional view showing a part of the partition portion during assembling operation.
Figure 14:
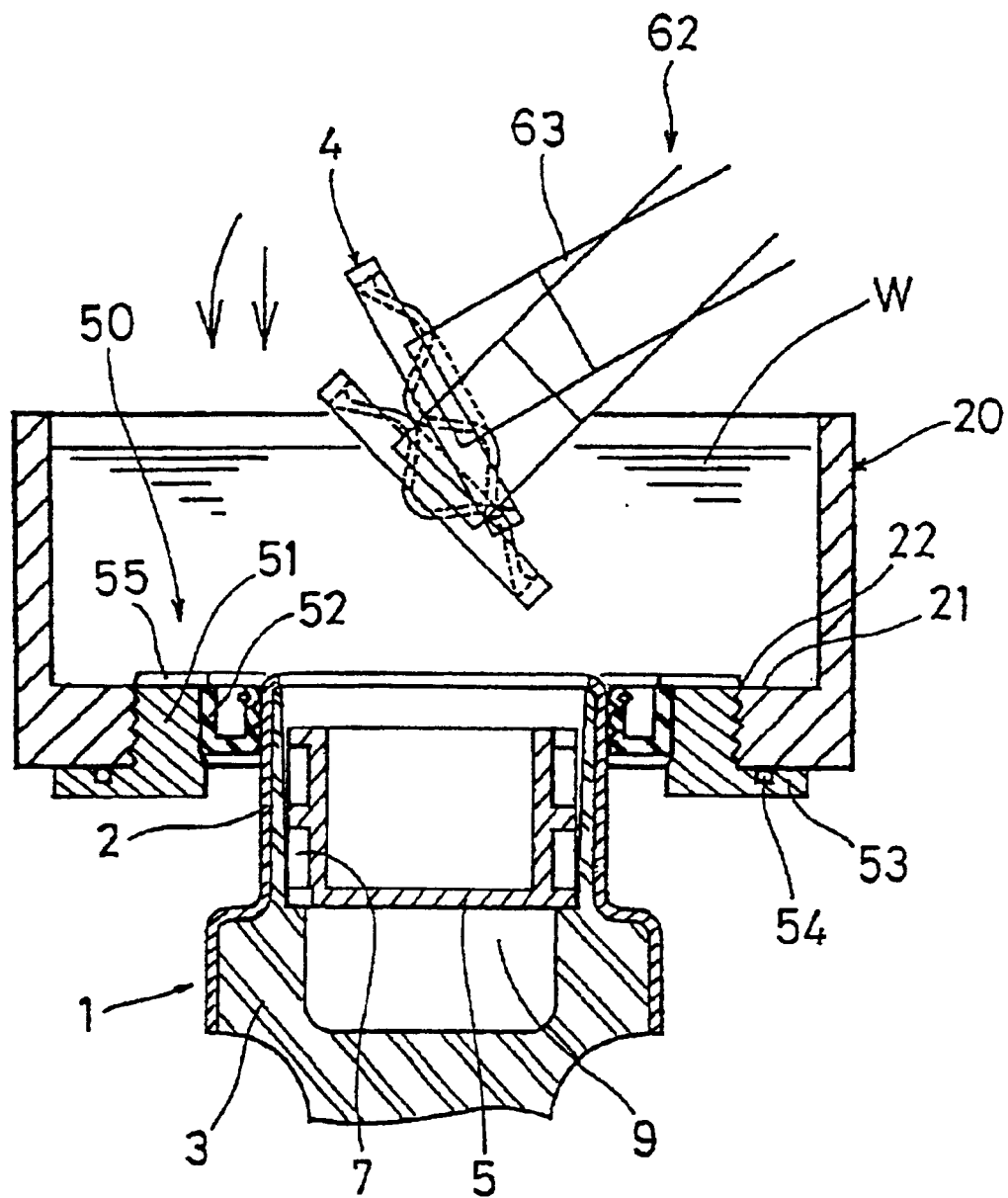
FIG. 14 is an enlarged sectional view showing a part of a diaphragm during assembling operation.

The support member 13 is configured to cope with multiple forms of body component 1 in consideration of setup change of the particular vibration isolating mount to be assembled. For example, the support member 13 is provided to allow its height to be adjusted by the use of height adjusting spacer 13a as shown in FIG. 13.

The reference numeral 20 designates a liquid bath supported by a liquid bath lifting means 30 so as to be lifted above the body set holding portion 10.

The liquid bath lifting means 30 is provided to lower the liquid bath 20 under a condition where the body component 1 is set and secured to the body set holding portion 10, and then to be assembled into the body component 1 described later, so that the liquid bath 20 is released from the body component 1 and lifted up after each component has been assembled.

The liquid bath lifting means 30 is configured by the use of a one-axis actuator. For example, in the figures, in front of the support substrate 31 erected on the base 11, there are a guide 32 vertically disposed as against the upper surface of the base 11, a slider 33 engaged with the guide 32 so as to be lifted and a screw axis 35 in mesh with the slider 33 and rotationally driven by a driving means 34 such as servomotor, so that the slider 33 is lifted up and down when the screw axis 35 is rotated by operating the driving means 34. Being fitted to the attachment plate 36 secured on the slider 33, the liquid bath 20 is lifted up and down as the slider 33 goes up and down. The liquid bath lifting means 30 is configured to minutely control the speed, position and the like when the liquid bath 20 is assembled to the body component 1.

In addition to this, it is also possible that the slider 33 could instead be lifted up by other means, such as cylinder device.

Figure 4:
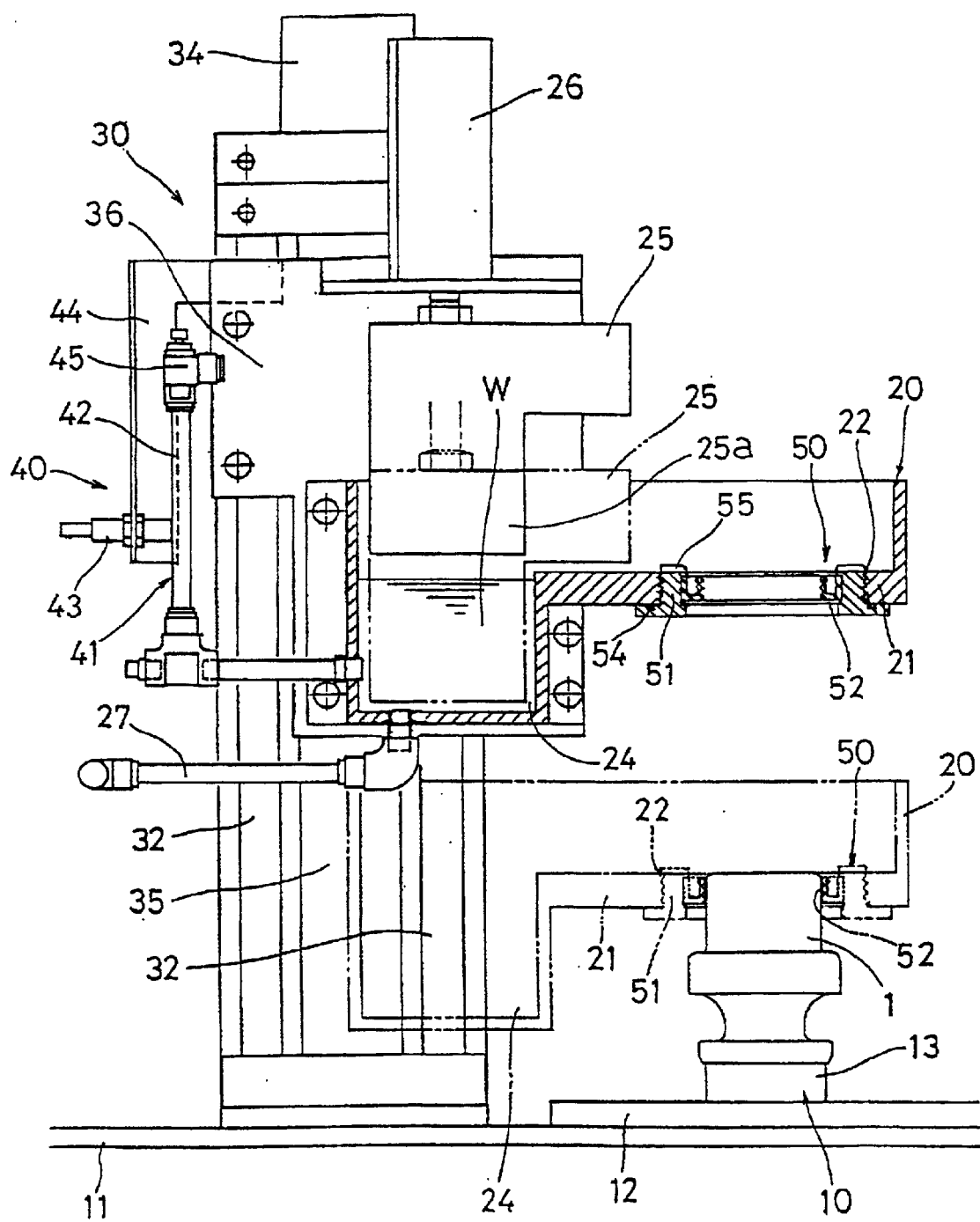
FIG. 4 is an enlarged elevational view of the section of a liquid bath showing an outline of a liquid bath lifting means of the embodiment of the invention.
Figure 5:
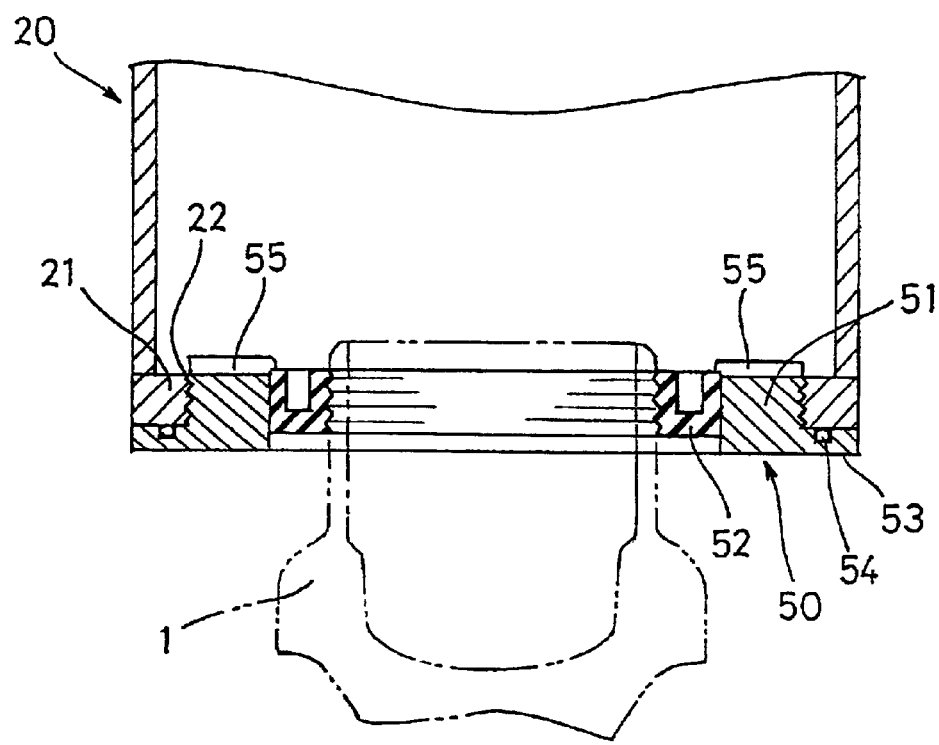
FIG. 5 is an enlarged sectional view of a fitted part of a seal member of the liquid bath of the embodiment of the invention.

As shown in enlarged views of FIGS. 4 and 5, the liquid bath 20 is provided with an opening portion 22 capable of engaging with the upper outer circumference of the body component 1 in a sealed state at the place corresponding with the body set position on the bottom portion 21. Since a seal member 50, such as an oil seal, is fitted to an inner circumference of the opening portion 22, it will elastically be engaged with an outer circumference of the body component 1 so as to keep the state of sealing. Under the condition of being assembled with the body component 1, a predetermined amount of the liquid can be stored on the top of the bottom portion 21.

The seal member 50 is detachably fitted by a screwing means especially from the lower surface side to the bottom portion 21, and can be replaced with a seal member of corresponding form or size according to a kind of vibration isolating mount to be assembled, especially a particular form of the body component 1. In this invention, the screwing operation for this replacement is performed on the upper surface side, that is, above the liquid bath 20.

Figure 6:
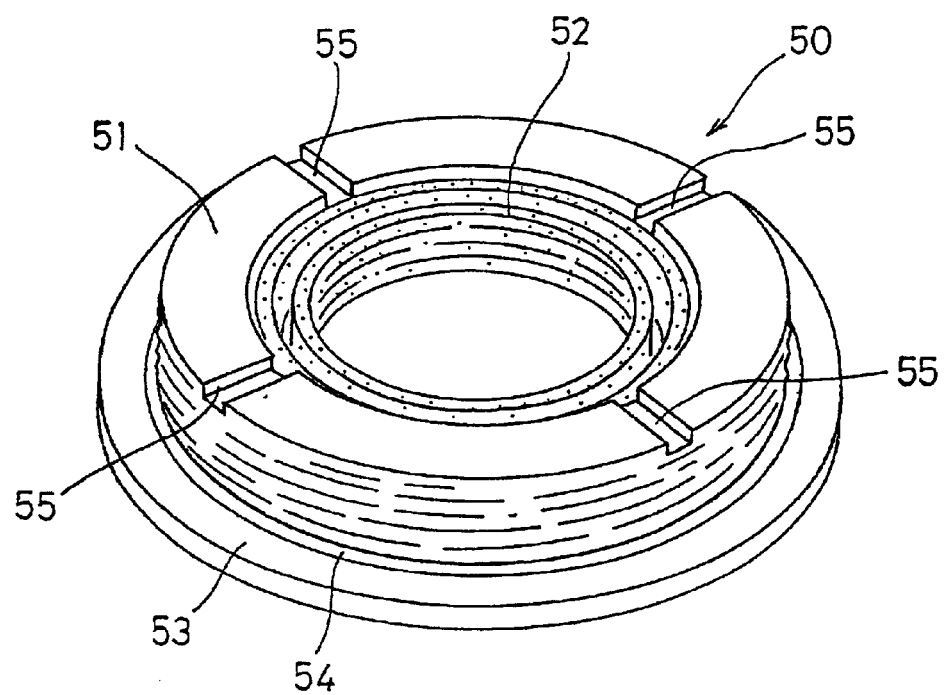
FIG. 6 is a perspective view of the seal member of the embodiment of the invention.

Concretely, as shown in FIGS. 5 and 6, concerning the seal member 50, a seal body 52 roughly U-shaped in section and made of a rubber elastomer is secured to the inner circumference of an annular outer circumferential body 51 made of a metal, such as stainless steel or aluminum or a rigid material such as synthetic resin by vulcanization adhering or press-fit means and the like. The outer circumferential surface of the outer circumferential body 51 is threaded to screw on the inner circumference of the opening portion 22 on the liquid bath bottom portion 21. There is an outwardly extending flange-like portion 53 formed at the lower end portion of the outer circumferential body 51, so that an annular seal material 54 can be held between the lower surface of the bottom portion 21 and the flange-like portion 53 under a condition where the outer circumferential body 51 is screwed on and fitted to the inner circumference of the opening portion 22.

Groove-like notches 55 for screwing operation are formed at the position in the cross direction against the axial center on an upper surface of the outer circumferential body 51 protruding from the upper surface of the bottom portion 21, thereby allowing the screwing operation using the screwing operation jig to be performed on the upper surface side.

Figure 7:
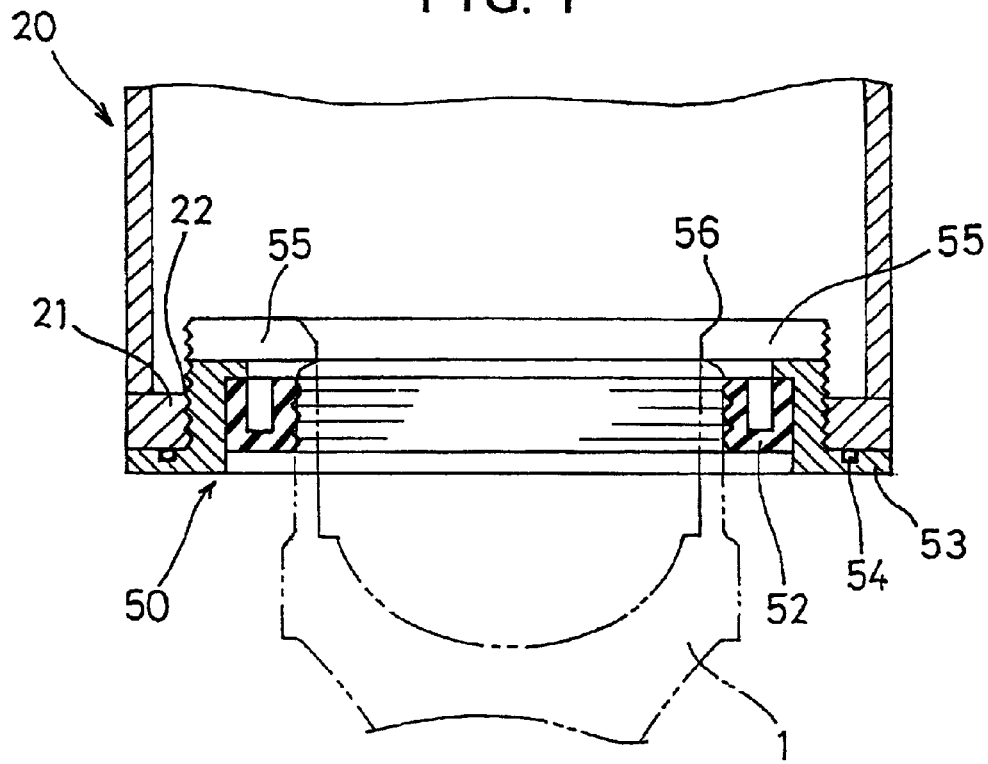
FIG. 7 is an enlarged sectional view of the fitted part of the seal member of the other embodiment of the invention.
Figure 8:
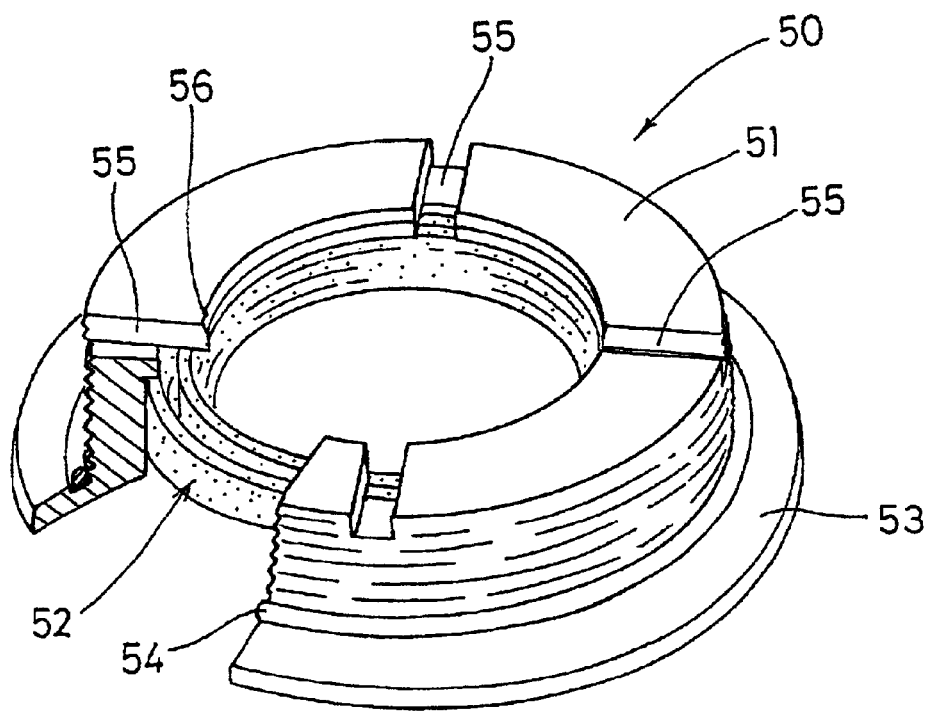
FIG. 8 is a perspective view, parts being broken away, of the seal member of the invention.

FIGS. 7 and 8 show an example in which the seal material 50 is changed according to the modification of the body component 1.

In this embodiment, the outer circumferential body 51 of the seal member 50 has an inner flange 56 for positioning, on which the upper end portion of the body component 1 engaging with the seal body 52 is abutted, on the inner circumference of the upper end portion protruding from the upper surface of the bottom portion 21, and the groove-like notches 55 for screwing operation are formed at the position in the cross direction against the axial center on an upper surface of the outer circumferential body 51 containing the inner flange 56. Thereby, the body component 1 engaging with the inside of the seal material 50 can be positioned, and furthermore the assembled condition of the body component 1 with the liquid bath 20 can always be kept constant.

With regard to the seal member 50 of any embodiments, the notches for screwing operation formed on the upper surface may assume any shape, such as a circular hole, according to the form of the screwing operation jig, and its position, spacing, quantity can also be set arbitrarily. In the case of the seal member 50 that consists of the cross groove notches as shown in the figures, the screwing operation can easily be carried out using a slotted jig. Additionally, liquid flow will be improved.

Furthermore, in the embodiments as shown in the figures, as supplying discharging means that supplies and discharges the liquid to and from the top of the bottom portion 21 of the liquid bath 20, the opening portion 22 is formed on the bottom portion 21 on one end side longitudinally in the liquid bath 20, a concave portion 24 protruded downwards so as to store a predetermined amount of liquid W disposed at a part except near the opening portion 22, for example, at a part longitudinally on the other end side. A charging float 25 having a convex portion 25a capable of fitting into the concave portion 24 on the lower surface side is connected to the cylinder device 26 and lifted according to the operation of the cylinder device 26. Thus it is configured that the liquid W stored in the concave portion 24 can be supplied on the top of the bottom portion 21 or discharged from the top of the bottom portion 21 by means of the lifting action of the charging float 25.

That is, when the charging float 25 moves downwardly and fits into the concave portion 24, the liquid W in the concave portion 24 is pushed out to the top of the bottom portion 21 and stored at a predetermined liquid level. Additionally, when the charging float 25 moves upwardly, the liquid W on the top of the bottom portion 21 flows backward into the concave portion 24.

The capacity of the concave portion 24 and the volume of the charging float 25 are set so as to secure a predetermined liquid level, required for a deaerating operation of the components described later, on the top of the bottom portion 21 outside of the charging float 25 when the charging float 25 moves downwardly and fits into the concave portion 24.

The reference numeral 27 designates a supply pipe connected with a supplying means (not shown) such as a pump to supply the liquid to the liquid bath 20 and is connected to the bottom portion of the concave portion 24. Since the liquid is reduced for every one liquid supply operation, the liquid supplying means is set to replenish the liquid appropriately to the liquid bath 20 so that more than a certain amount of liquid can be stored on the top of the bottom portion 21 of the liquid bath 20 when the liquid is supplied by the liquid supplying discharging means, i.e., when the liquid is supplied as the charging float 25 falls. A pump is normally provided as the liquid supplying means so as to be operated on the basis of the result of detection of the liquid level described later. A discharging port (not shown) for discharging the liquid in the liquid bath 20 at the time of maintenance/inspection or washing and the like is also provided on the bottom portion of the concave portion 24.

As the liquid supplying discharging means to the top of the bottom portion 21 of the liquid bath 20, various means can be utilized in addition to the means described above, for example, a supplying discharging mechanism using pump means. However, it is especially preferable to configure the means described above for practical purposes because the mechanism is simple and yet liquid supplying/discharging action can be performed rapidly and definitely.

The reference numeral 40 designates a liquid level detecting pipe used to detect a liquid level when supplying the liquid on the top of the bottom portion 21 using the liquid supplying discharging means. The invention is configured so that the component incorporation device 60 described later is controlled through the device control portion on the basis of the detecting signal of the liquid level detected by the liquid level detecting pipe 40. The liquid level detecting pipe 40 has a vertical detecting piping 41 connected to the lower portion of the liquid bath 20 so that the liquid can be flowed. A transparent pipe portion 42 is provided at least for a part of the detecting piping 41. A level sensor 43 is also provided near the transparent pipe portion 42 to detect the liquid level of the flowing liquid, capable of lifting together with the liquid bath 20. The reference numeral 44 designates a support member of the level sensor 43.

The reference numeral 60 designates the component incorporation device made up of a multi-axis multi-jointed robot and the like. A chuck device 62 having a pair of claws 63, 63 freely opening and closing is provided at the end of its hand 61. The component supply incorporation device 60 is controlled on the basis of the detect signal detected by the liquid level detecting pipe 40, starts operating according to the signal from the device control portion which receives a detecting signal detected when the liquid level on the top of the bottom portion 21 of the liquid bath 20 reaches a certain level during liquid supply, and comes to a stop when the liquid level is less than a certain level.

The component incorporation device 60 has been set and received a teaching operation so that the components such as the partition portion 5 and the diaphragm 4 set up on the component set jig 14 are sequentially chucked by the chuck device 62 according to various parameters. These include the position of the body component 1 set up and secured on the body set holding portion 10, the position of each component set up on the component set jig 14, the positional relation such as height of the liquid bath 20 assembled to the body component 1 and the liquid level on the top of the bottom portion 21 in the liquid bath 20, the operation assembled into the body component 1 when the liquid bath 20 falls, and also the liquid level, before moving upwards the liquid bath 20 assembled into the body component 1 as well as lifting down at the position corresponding to the body component 1, so as to perform a predetermined deaerating operation, such as a deaerating operation by immersing the chucked component in the liquid in an inclined position, and an incorporating operation described later. Furthermore, the device is set to correct its operation as occasion demands.

When assembling a liquid filled vibration isolating mount using the device described in the embodiments, the operations of assembling each component into the body component 1 and supplying the liquid therein are also described below.

First, the body component 1, having the inside space and an opening on one end side, is placed and set on the support member 13 of the body set holding portion 10, under a nearly upright condition with the opening faced upwards. Then, the components such as the partition portion 5 and the diaphragm 4 are placed at a regular position on the component set jig 14.

Under this condition, when starting the device by operating the buttons and the like, in reference to the body set holding portion 10, the cylinder device 16 of the securing means 15 is activated to advance the chuck device 17 at its end. The chuck device 17 now chucks the body component 1 to secure and hold it in the set position.

When the body component 1 is secured, the liquid bath lifting means 30 is then operated. When the driving means 34 is driven, the liquid bath 20 moves down together with the slider 33 as shown by a chain line in FIG. 4. Then, the opening portion 22 on the bottom portion 21 is engaged with the outer circumference of the body component 1 being positioned and held thereon, and assembled into the body component 1 through the seal member 50 provided on the opening portion 22 so as to keep the sealed state. As shown in FIG. 7, when there is an inner flange 56 on the inner circumference of the upper end portion protruded from the upper surface of the bottom portion 21, the upper end portion of the body component 1 engaged with the seal body 52 abuts on the inner flange 56 to position the body component 1, and thus, the assembled condition due to engagement is always kept constant. The body component 1 has now less area coming into contact with the liquid.

A predetermined amount of the liquid W is stored in the concave portion 24 provided at a part of the bottom part in this liquid bath 20. After each component has been assembled to the body component 1, the charging float 25 moves downwardly when the cylinder device 26 is operated. Then, as shown in a chain line in FIG. 4, when the convex portion 25a fits into the concave portion 24, the liquid W in the concave portion 24 is pushed out and supplied to the top of the bottom portion 21, with which the body component 1 is engaged. Thereby, the liquid flows from the opening end of the body component 1 protruded from the bottom portion 21 into the inside space 9 of the body component 1 and is then stored at a predetermined liquid level required to assemble the component.

Additionally, when the liquid W reaches a certain level by supplying the liquid to the bottom portion 21, the component incorporation device 60 is operated, as shown in FIGS. 12 and 13, to chuck the components such as the partition portion 5 and the diaphragm 4 supplied and set at a predetermined position on the component set jig 14 successively by the chuck device 62 at the tip of the hand 61, move on the liquid bath 20, move downwardly while holding a predetermined inclined position, immerse in the liquid W stored in the liquid bath 20 in the inclined position and deaerate before returning to a horizontal position in the liquid W and fitting and assembling into the opening end of the body component 1. At this time, the component can be assembled by being pushed into a predetermined position using a cylinder 65 for partition portion or diaphragm placement, as occasion demands. The hand 61 returns to its original position and prepares for the following assembly.

When each component has been assembled as described above, the cylinder device 26 is operated to lift up the charging float 25. Accordingly, the liquid W flows backwards into the concave portion 24 and is discharged from the bottom portion 21. After that, the liquid bath lifting means 30 is operated to lift up the liquid bath 20 and release from the body component 1. Furthermore, the fixing means 15 is unchucked by the chuck device 17, and then the chuck device 17 is returned to its original position by the cylinder device 16. Thus assembled products are transferred from the body set holding portion 10 to post-process, such as caulking operations. This completes assembling operations.

In reference to the devices described above in the embodiments, the operations, such as holding of the body component 1 by the fixing means 15, assembling to the body component 1 by lifting down the liquid bath 20, supplying and storing the liquid into the top of the bottom portion 21 by lifting down the charging float 25, assembling each component by the component incorporation device 60, discharging the liquid from the top of the bottom portion 21 by lifting up the charging float 25, releasing from the body component 1 by lifting up the liquid bath 20, and releasing the body component 1 held by the body set holding portion 10, are set and controlled so as to perform corresponding associated operations successively.

When changing the setup of the vibration isolating mount to be assembled, the seal member 50 fitted at the opening portion 22 on the bottom portion 21 in the liquid bath 20 is replaced with the corresponding seal member according to shape change of the body component 1. However, even if the seal member 50 is fitted by the screwing means from the lower surface side of the bottom portion 21, it is possible to perform its screwing operation from the upper surface side of the liquid bath.

Since a groove notch 55 for screwing operation is formed, for example, in the cross direction, on the upper surface of the outer circumferential body 51 protruded from the upper surface of the bottom portion 21, the screwing operation can easily be performed from the upper surface side so as to engage the screwing jig against the notch 55, allowing easy replacing operation.

Additionally, since the seal member 50 is screwed and fitted from the lower surface side against the bottom portion 21 of the liquid bath 20, the seal material 54 at the screw portion can be held in the same manner as the conventional one.

As the aforementioned device according to the invention, wherein component assembling and liquid containing operations of the liquid filled vibration isolating mount can be carried out using a relatively small liquid bath, without moving the body component being set and held at a predetermined position and also immersing the most of the body component in the liquid, especially the seal member fitted to the opening portion on the bottom portion of the liquid bath can easily be replaced by the screwing operation from the upper surface side, allowing downtime for setup change to be shortened and operability to be raised.

What is claimed is:

1. A component incorporation and liquid filling device for a liquid filled vibration isolating mount which includes a body component, the device comprising:

a body set holding portion which supports and secures the body component of the vibration isolating mount, said body component having an inside space and an opening on one end, the opening being faced upwards in a substantially perpendicular state;

a liquid bath which is disposed above the body set holding portion so as to be liftable and lowerable, a bottom portion of said liquid bath including an opening portion engageable with an outer circumference of the body component in a state of seal through a descent action of the liquid bath, said liquid bath being capable of storing a liquid over the bottom portion when the opening portion is engaged with the body component;

a liquid supplying/discharging means for supplying and discharging the liquid to and from the top of the bottom portion having the opening portion corresponding with a state of engagement of the liquid bath to the body component;

a component incorporation device which serves to assemble vibration isolating mount components to the body component in a state that the liquid is stored over the bottom portion in the liquid bath; and an annular seal member elastically fittable on the body component, said annular seal member being threadably fitted to screw threads carried at the opening portion on the bottom portion of the liquid bath from a lower surface side, a portion of said annular seal member seating against the bottom portion of the liquid bath when the annular seal member is installed to the liquid bath by being screwed upwardly into said opening portion by a tightening operation performed thereon, the seal member having a structural configuration allowing said tightening operation to be implemented from an upper surface side of said liquid bath.

2. The device according to claim 1, wherein the seal member includes a seal body made of a rubber elastomer fitted to an inner circumference of an annular outer circumferential body made of a rigid material, said annular outer circumferential body being fitted to an inner circumference of the opening portion, said structural configuration including a notch for implementing the tightening operation which is provided on an upper surface of the outer circumferential body of the seal member protruded on the top of the bottom portion.

3. The device according to claim 2, wherein:

the outer circumferential body of the seal member includes a positioning inner flange, an upper end portion of the body component protruding from an upper surface of the bottom portion when the body component is engaged with the seal body abutting said inner positioning flange; and said notch of said outer circumferential body includes a notch groove for the tightening operation formed in a cross direction with respect to an axial center which is formed on the upper surface of the outer circumferential body including the inner flange.

4. A component incorporation and liquid filling device for a liquid filled vibration isolating mount which includes a body component, the device comprising:

a body set holding portion which supports and secures the body component of the vibration isolating mount, said body component having an inside space and an opening on one end, the opening being faced upwards in an approximately perpendicular state;

a liquid bath which is disposed above the body set holding portion so as to be liftable and lowerable, a bottom portion of said liquid bath including an opening portion engageable with an outer circumference of the body component in a state of seal through a descent action of the liquid bath, said liquid bath being capable of storing a liquid over the bottom portion when the opening portion is engaged with the body component;

a liquid supplying/discharging means for supplying and discharging the liquid to and from the top of the bottom portion having the opening portion corresponding with a state of engagement of the liquid bath to the body component;

a component incorporation device which serves to assemble vibration isolating mount components to the body component in a state that the liquid is stored over the bottom portion in the liquid bath; and an annular seal member elastically fittable on the body component, said annular seal member being threadably fitted to screw threads carried at the opening portion on the bottom portion of the liquid bath from a lower surface side, a portion of said annular seal member seating against a portion of the liquid bath when the annular seal member is installed to the liquid bath by being screwed upwardly into said opening portion by a tightening operation performed thereon, said seal member including a seal body made of a rubber elastomer fitted to an inner circumference of an annular outer circumferential body made of a rigid material, said annular outer circumferential body being fitted to an inner circumference of the opening portion, the outer circumferential body of the seal member including a positioning inner flange, an upper end portion of an body component protruding from upper surface of the bottom portion when the body component is engaged with the seal body abutting said inner positioning flange, said seal member including a notch groove for the tightening operation formed in a cross direction with respect to an axial center which is formed on an upper surface of the outer circumferential body which includes the inner flange so as to allow said tightening operation to be implemented from an upper surface side of said liquid bath.

* * * * *